Nov. 12, 1946.  J. H. REISNER  2,410,999
BULKHEAD CONDUIT SUPPORT AND SEAL
Filed Nov. 16, 1942
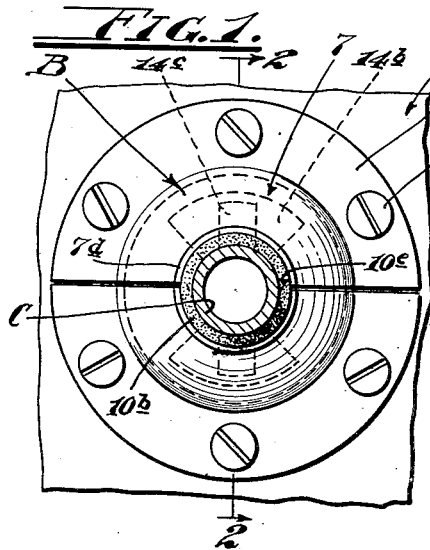
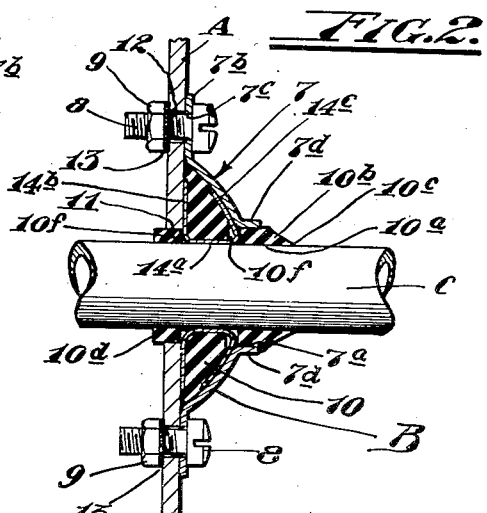
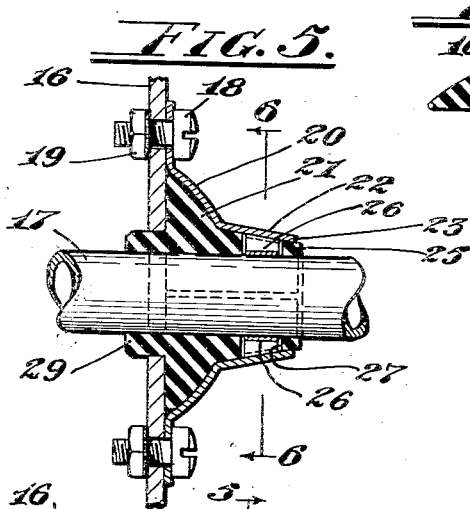
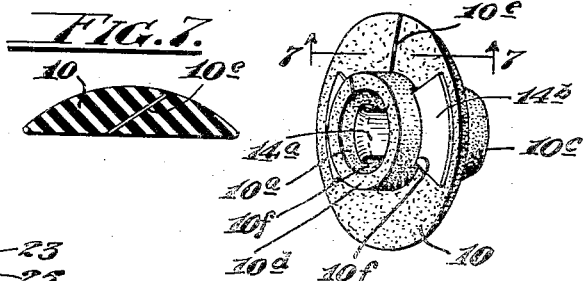
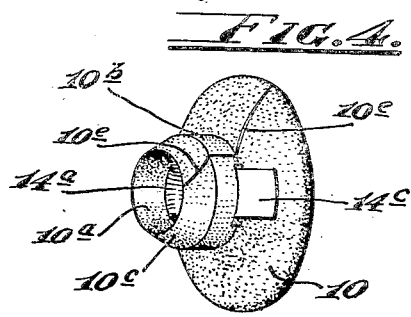
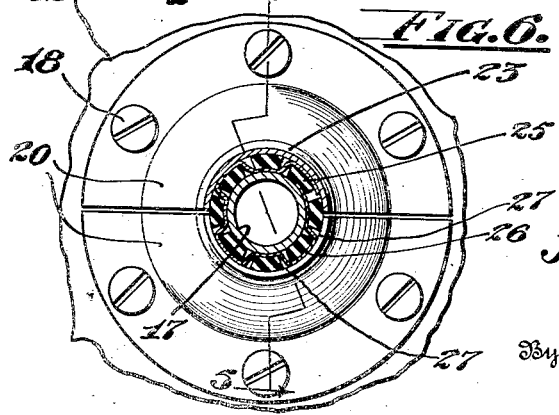

Patented Nov. 12, 1946

2,410,999

UNITED STATES PATENT OFFICE 2,410,999

BULKHEAD CONDUIT SUPPORT AND SEAL

Joseph Henry Reisner, Hagerstown, Md., assignor to Adel Precision Products Corp., a corporation of California Application November 16, 1942, Serial No. 465,777

5 Claims. (Cl. 285—30)

This invention relates in general to conduit supports for aircraft and more particularly pertains to an especially constructed device for supporting a conduit line on an aircraft bulkhead or wall through which the conduit line is extended.

An important object of my invention is to provide a conduit line supporting and cushioning device of the character described which will hermetically seal the conduit accommodating-opening in a bulkhead or wall of a pressure sealed cabin or compartment in an aircraft or seal the conduit accommodating-opening in any member or support where a seal is desired.

Another object of my invention is to provide a bulkhead conduit support of the character described having a cushioned and vibration-absorbing seat for the conduit line which prevents the line from contacting the bulkhead and protects the line from wear as well as forms a fluid-tight seal around the conduit and the conduit-receiving hole in the bulkhead.

A further object is to provide a conduit support of the character described in which a bonding strip is provided for electrically bonding the conduit line to the bulkhead or wall to prevent accumulation of static electricity in the line.

Yet another important object of my invention is to provide a bulkhead conduit support such as described hereinbefore which makes it unnecessary to use special fittings, couplings or connections and a sectional conduit line where said line passes through the wall or bulkhead, all to the end that fewer parts are required, a marked reduction in weight is effected, a continuous line through the wall or bulkhead is made possible, a quicker and easier installation of the line is assured, and provision made for absorbing vibration in and preventing wear of the conduit line.

An additional object of my invention is to provide a conduit support of the character described wherein a bonding strip is provided with portions for engaging the conduit line, a metallic conduit-encircling body portion, and the metal wall or bulkhead of the aircraft, respectively, to insure an efficient electric bond between the conduit line and the metal structure of the aircraft.

Yet another object is to provide a conduit support such as described in which the metal body portion is made in sections to facilitate a quick and easy installation thereof and to make possible the clamping of the cushion under compression on the conduit line, and against the wall or bulkhead thereby assuring the hermetic sealing action of the cushion and also forcing the bonding strip into good contact with the conduit and the body portion.

With the foregoing objects in view, together with such other objects and advantages as may subsequently appear, the invention resides in the parts and in the combination, construction and arrangement of parts hereinafter described and claimed, and illustrated by way of example in the accompanying drawing, in which:

Fig. 1 is a front elevational view of a bulkhead conduit support and seal embodying my invention, as when installed, the conduit being shown in cross section;

Fig. 2 is a vertical sectional view taken on the line 2—2 of Fig. 1;

Fig. 3 is a perspective view of the cushion-bonding strip assembly showing the inner face of the cushion;

Fig. 4 is a perspective view of the cushion-bonding strip assembly showing the outer face of the cushion;

Fig. 5 is a vertical sectional view taken on the line 5—5 of Fig. 6 of a modified form of my invention;

Fig. 6 is a sectional view taken on the line 6—6 of Fig. 5;

Fig. 7 is a horizontal sectional view taken on the line 7—7 of Fig. 3.

Referring to the drawing more specifically, A designates a metallic bulkhead or wall or member as provided in an aircraft, for example, for a cabin or compartment which is hermetically sealed to retain requisite pressure for high altitude flying or other purposes, there being a conduit supporting and sealing device B embodying my invention, bolted to said bulkhead for supporting a conduit line C which is extended through the bulkhead, the device B also providing a hermetic seal where the conduit penetrates said bulkhead.

In accordance with my invention the conduit support and seal B generally includes a form retaining and somewhat rigid body portion 7 which is secured by bolts 8 and nuts 9 to the bulkhead or wall, and supports a conduit-embracing cushion 10 held in place and under compression by means of said body portion, so that the cushion is clamped against the bulkhead and around the conduit to form a hermetic seal relative to the conduit and conduit-receiving opening 11 in said bulkhead, while at the same time serving as a vibration absorbing conduit seat which spaces the conduit from contact with the bulkhead and body portion and protects it from wear and damage.

The bolt holes 12 are sealed by means of sealing gaskets 13.

The body portion 7 as shown in Figs. 1 and 2 is preferably formed of a somewhat resilient and light-weight metal, and is circular and generally cup-shaped or concavo-convex with a central conduit-receiving opening 7a and formed of like halves or semi-circular sections. Each section is provided with arcuate flange 7b on its outer margin, which flange is adapted to lie parallel to and against the bulkhead A and is provided with bolt holes 7c whereby the two sections may be bolted with their concave sides facing said bulkhead for holding the cushion 10 in place.

At the inner margins of the sections or halves of the bell-shaped body portion 7 are arcuate flanges 7d defining the conduit-receiving opening through the center of the body portion, and extending outwardly from the convex side of the body portion. The flanges 7d surround the conduit in circumferentially spaced relation thereto whereby a portion of the cushion 10 may be interposed between them and the conduit.

The cushion 10 is preferably annular and formed of soft rubber, synthetic rubber, or similar compressible and elastic and insulation material and has its main or body portion of a substantially semi-spherical cross section so that it will conform to and fit snugly in the concave side of the body portion 7. A conduit-receiving opening 10a is provided through the center of the cushion and registers with the opening 7a through the center of the body portion 7. A tubular projection or annular flange portion 10b is provided on the outer or convex face of the cushion and projects through the opening 7a in the body portion 7 so that it will be forced by the surrounding flanges 7d into close contact with the conduit and form a seal as well as a cushioned seat around the conduit at this point. The outer end of this portion 10b is tapered to a thin edge as at 10c so that the pressure in the airplane cabin will be effective against this thin edge to augment the sealing action of the cushion.

On the inner or flat side of the cushion 10 is a tubular projection 10d thereof which extends through and serves as a lining for the opening 11 in the bulkhead to cushion the conduit where it passes through said bulkhead, as shown in Fig. 2. The projections 10b and 10d are permanent parts of the cushion and do not result from compression being applied thereto.

The annular cushion 10 as here shown is diagonally split as at 10e to provide for ready mounting thereof on the conduit, the diagonal split providing opposed relatively large opposed surfaces which as shown in Fig. 7 will closely engage one another and form a seal when the cushion is clamped on the conduit by means of the sectional body portion 7.

The sectional construction of the body portion 7 and split annular cushion 10 facilitates the installation of the device and provides for a clamping of the cushion under compression around the conduit and against the bulkhead A to provide a reliable holding of the conduit in a vibration-absorbing and "wear proof" seat as well as a reliable hermetic seal around the conduit and the opening 11 in the bulkhead.

As shown in Fig. 2 the cushion 10 is provided with opposed metallic bonding strips each including an intermediate portion 14a to seat on the conduit C, relatively wide end portions 14b to insure good contact with the bulkhead A and a narrower end portion 14c to effectively contact the inner surface of the associated section of the body portion 7. These portions of the bonding strip are forced by the bell-shaped cushion into close and effective flatwise bonding contact with the conduit, bulkhead and sections of the body portion respectively as shown in Fig. 2 to insure a proper "grounding" of the conduit to the metal body structure of the aircraft.

The bonding strips may be anchored to the cushion 10 by forming slots 10f in the cushion and threading the strips therethrough as shown in Fig. 2.

It is seen that upon bolting the sections of the body portion 7 to the bulkhead A the cushion 10 will be placed under compression and tightly clamped around the conduit C. The faces of the cushion opposed to the bulkhead are forced into close and sealing contact therewith around the opening 11 through the bulkhead, whereas the flanges 7b will force and hold the projecting portion 10b of the cushion into sealing contact with the conduit, there being a tensioned clamping action due to the construction and arrangement of the body portion and cushion and the compression of the various portions of the resilient cushion.

With reference to Figs. 5 and 6 wherein a modified form of my invention is shown, the bulkhead 16, conduit 17, bolts 18, nuts 19, sectional metallic body member 20 and annular split cushion 21 are substantially the same as to construction and arrangement as the corresponding parts of the first described form shown in Figs. 1, 2, 3, 4 and 7. In this modified form the sections of the body 20 are provided with longer flanges 22 corresponding to the flanges 7d, which longer flanges form a tapered projection 23 on the body portion. The tubular projection 25 on the cushion 21 is likewise longer than the corresponding portion of cushion 10 in the first described form of the invention and is tapered to fit snugly in the projection 23, which exerts a clamping action on said projecting cushion portion.

A bonding strip 26 is threaded through a circular series of openings 27 in the projecting portion 25 of the cushion 21 so that portions of the strip will contact the conduit while other portions contact the flanges 22 of the body member 20, thereby bonding the conduit to the bulkhead through the strip 26, the sections of the metal body portion and the bolts 18 and nuts 19.

The tapered flanges 22 and tapered projection 25 cause the cushion to be placed under compression and form an effective seal when the body member is tightly bolted to the bulkhead. The cushion 21 is also provided with a tubular sealing and cushioning projection 29 on its inner side corresponding to the portion 10d of cushion 10 and for the same purpose.

While I have shown and described specific embodiments of my invention I do not limit myself to the exact details of construction set forth, and the invention embraces such changes, modifications and equivalents of the parts and their formation and arrangement as come within the purviews of the appended claims.

I claim:

1. In a support for a conduit which is passed through an opening in a member in which it is desired to seal said opening, a cushion of compressible material having a sealing surface for engaging said member around the opening therein, and a conduit seating surface for embracing and forming a seal around the conduit, a tubular extension of said cushion projecting through and lining the opening in said member, and means for supporting said cushion on said member and holding the cushion and said tubular extension thereof under compression against said member and the conduit, said tubular extension of said cushion forming a permanent part thereof.

2. In a support for a conduit which is passed through an opening in a member in which it is desired to seal said opening, a cushion of compressible material having a permanent annular axial projection which has a sealing surface for engaging said member around the opening therein, and a conduit seating surface for embracing and forming a seal around the conduit, and means for supporting said cushion on said member and holding the cushion under compression against said member and the conduit.

3. In a support for a conduit line which is extended past a wall or like member, a conduit encircling cushion of compressible material having its inner surface disposed to contact said wall or like member, a body member against the side of which the outer surface of said cushion is engaged, a marginal portion on said body member adapted to be secured against said wall or the like, a tubular projection on the outer face of said body member through which the conduit extends, and a permanent tubular extension of said cushion for surrounding said conduit and lining the interior of said tubular projection, and a metallic bonding strip carried by said tubular extension of the cushion having a portion interiorly of said extension for engaging the conduit, and a portion lying between the cushion and the projection of the body.

4. In a support for a conduit line which is extended past a wall or like member, a conduit encircling bell-shaped cushion of compressible material having its inner surface disposed to contact said wall or like member, a body member against the side of which the outer surface of said cushion is engaged, and a marginal portion on said body member adapted to be secured against said wall or the like, said body member being a bell-shaped shell which fits over the exterior of said cushion, and a metallic bonding strip mounted on the cushion so that a portion thereof will be forced by said cushion against the conduit and other portions forced by the cushion into contact with said wall and said body member respectively.

5. In a support for a conduit which is passed through an opening in a wall or the like, an annular bell-shaped cushion of compressible material for embracing a conduit as a cushioned seat therefor and for engaging said wall or the like, a bell-shaped body member for supporting said cushion under compression against the conduit and said wall or the like, and a bonding strip having one end portion positioned in flatwise contact with said body, its opposite end portion positioned for flatwise contact with said wall, and its intermediate portion positioned for flatwise contact with said conduit, said bell-shaped body having a peripheral flange to receive fasteners extending through the wall which place under compression all the aforesaid portions of said bonding strip.

JOSEPH HENRY REISNER.